(12) United States Patent
McDermott

(10) Patent No.: US 8,612,880 B2
(45) Date of Patent: Dec. 17, 2013

(54) SYSTEM AND METHOD FOR DOCUMENT MANAGEMENT

(75) Inventor: David D. McDermott, Topeka, KS (US)

(73) Assignee: Inware, LLC, Independence, OH (US)

( * ) Notice: Subject to any disclaimer, the term of this patent is extended or adjusted under 35 U.S.C. 154(b) by 1106 days.

(21) Appl. No.: 12/044,300

(22) Filed: Mar. 7, 2008

(65) Prior Publication Data

US 2009/0228819 A1 Sep. 10, 2009

(51) Int. Cl.
*G06F 3/00* (2006.01)
*G06F 9/00* (2006.01)
*G06F 17/00* (2006.01)

(52) U.S. Cl.
USPC .......................... 715/779; 715/764; 715/711

(58) Field of Classification Search
USPC .......................... 715/779, 764, 711
See application file for complete search history.

(56) References Cited

U.S. PATENT DOCUMENTS

| | | | |
|---|---|---|---|
| 6,084,585 A * | 7/2000 | Kraft et al. | 715/733 |
| 7,185,290 B2 * | 2/2007 | Cadiz et al. | 715/838 |
| 7,836,401 B2 * | 11/2010 | Hathaway | 715/714 |
| 2006/0036946 A1 * | 2/2006 | Radtke et al. | 715/711 |

* cited by examiner

*Primary Examiner* — Boris Pesin
*Assistant Examiner* — Sabrina Greene
(74) *Attorney, Agent, or Firm* — Turocy & Watson, LLP

(57) ABSTRACT

Systems and methods for uploading documents to a document database by using an efficient drag and drop interface is provided. The drag and drop interface includes a persistent and movable drop box rendered on an operating system. The drop box is preconfigured to access a document database to upload documents. Furthermore, the drop box is persistently available on a desktop of the operating system, wherein one or more objects can be dragged and dropped for upload to the document database from any other interface or from the desktop, whereupon documents corresponding to the one or more objects are uploaded to the database based on preconfigured destination locations to which to upload.

20 Claims, 5 Drawing Sheets

SYSTEM AND METHOD FOR DOCUMENT MANAGEMENT

FIELD OF THE INVENTION

The invention relates to systems and methods for uploading documents to a document database by using a drag and drop interface that includes a persistent and movable drop box rendered on an operating system.

BACKGROUND OF THE INVENTION

Organizations often have reams of data and documents that may be stored across disparate databases and other storage devices. This leads to difficulties in uploading documents because it is often a hassle to operate the various interfaces presented by these disparate databases and devices. Other problems arise when attempting to store documents retrieved from applications such as email clients or web browsers. Oftentimes a user must save documents separately, then upload the documents using the aforementioned variety of interfaces. As a result, various solutions have emerged to help track and manage file upload processes.

However, conventional systems fail to give the user an easy-to-use, configurable interface that enables access to a variety of databases. For example, the user is left to save documents attached in email, for example, then upload the documents separately. Alternatively, the user must use an email client to save the document into a document database directly while navigating difficult to use user interfaces. These interfaces typically fail to provide the user insight as to where the documents should be uploaded.

Conventional systems to upload documents to a document database suffer from these and other problems.

SUMMARY OF THE INVENTION

The invention solving these and other drawbacks of conventional systems relates to a system and method for uploading one or more documents using an efficient user interface.

In some implementations, the efficient user interface may provide a configurable and persistent document drop element (also sometimes referred to as a "doc drop element") that is movable about a desktop interface of an operating system. The persistent element, which may be or include a semi-transparent icon, may be configured, for example, to interface with a document management database such that information related to the one or more documents may be relayed to the document management database. The persistent element may comprise a persistent area over which an object may be dragged and dropped such as, for example, a sticky icon, hyperlink, window, or other area. The persistent area may be persistently displayed through any other application interface that may be running on the operating system. For example, the persistent area may be continuously visible (although semi-transparent) and accessible even if a web browser, email client, or other application is running on the operating system in which the same pixel space is occupied by their respective interfaces. In other words, the persistent area remains in the foreground of the user interface. This aspect of the invention enables dragging and dropping an object, for example, from any application or from the desktop of the operating system regardless of other applications running on the operating system. The object may be an icon, for example, that represents one of the one or more documents that are to be uploaded. The drag and drop event may be detected by interfacing with the operating system to listen for, receive, and/or process events that may be relevant to the system of the invention. For example, drag and drop events using a mouse may be detected. Other events may be detected such as key entries using a keyboard, pointer device indicating an object, and/or other events. In some implementations, detection of the event may indicate a request to upload the object regardless of whether the event is a drag-and-drop, keyboard entry, pointer device, or other event. Upon receiving the event, data regarding the object may be received from the operating system and/or from the user.

In some implementations, for example, if the event is a drag-and-drop, the operating system may be queried to determine the nature of the dragged and dropped object. If the object corresponds to a document, for example, the file location of the document on disk may be ascertained from the operating system. Accordingly, the document may be uploaded using the file location to retrieve the source document. In another example, if the event is the actuation of a keyboard short-key, for example, wherein an object is not specified by the keyboard short-key, then a dialog box may be provided to receive input from a user specifying the one or more documents to be uploaded.

In some implementations, once the source location of the one or more documents has been identified, a dialog box may be provided to receive a document type that may be associated with the one or more documents. The document type may be an alias that serves as a name for the one or more documents. The document type may be predefined and each document type may correspond to a document description that describes the document type. For example, the one or more documents may correspond to documents related to sales data, sales agent, or any other category. Descriptions may also be pre-configured to provide any descriptive labels such as sales data time periods, particular agent data, or any other descriptive label. Furthermore, the destination location and/or the description of the destination location may be searchable to allow easy identification of the destination location.

According to various implementations, the document type may be communicated to the document management database using an interface associated with the document management. Thus, in operation, for example, the one or more documents may be dragged over the persistent doc drop element for rapid document identification and subsequent upload to the document management database.

Various implementations of the invention will be apparent to those skilled in the art based on the following drawings and detailed description.

DETAILED DESCRIPTION

A system and method for providing an interface for uploading one or more documents to a document management database may be provided.

Figure 1:
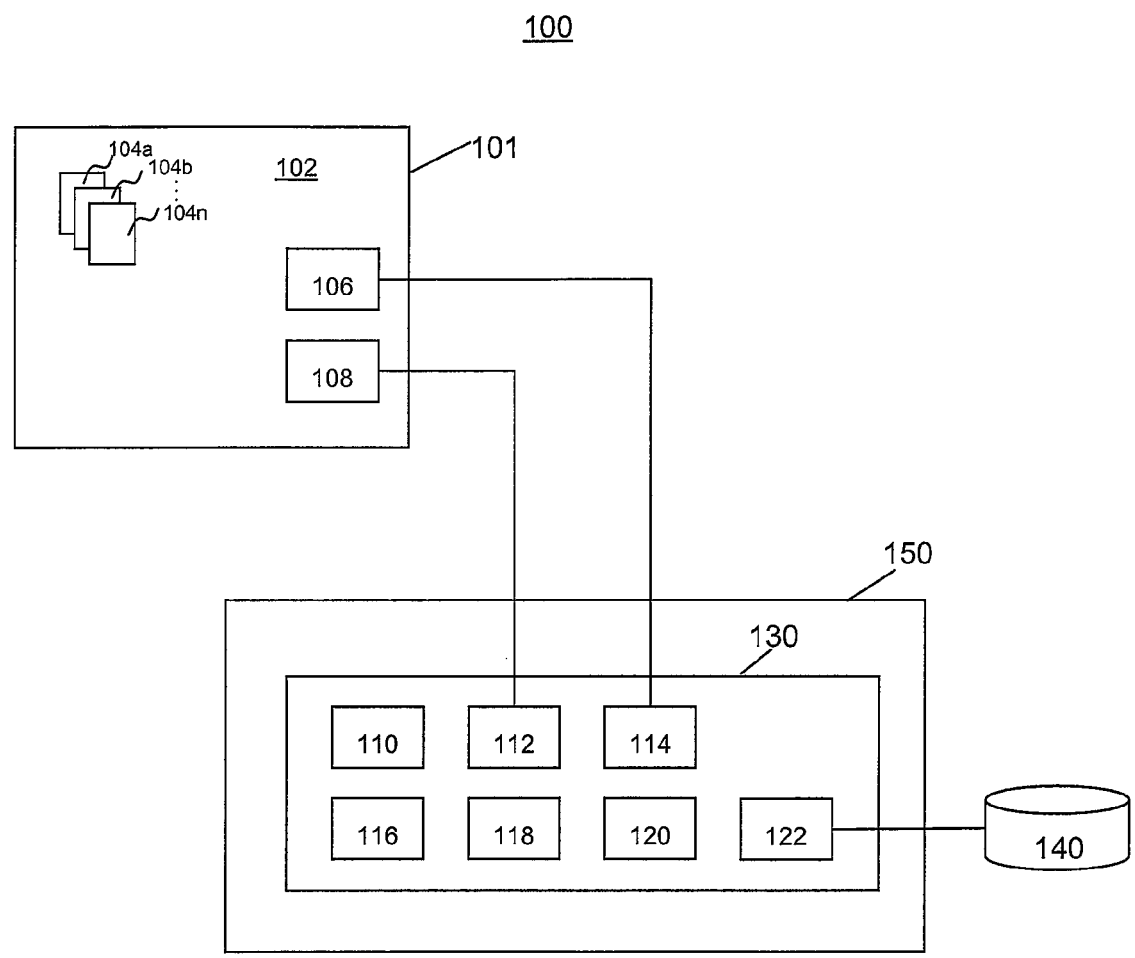
FIG. 1 illustrates an exemplary system for uploading one or more documents to a database according to various implementations of the invention.

FIG. 1 illustrates an exemplary schematic diagram of a system 100 for providing an interface to upload one or more documents 104a-104n to a database 140. The term document may refer to any dataset such as a word processing document, an image file, a movie file, a sound file, database entry, and/or any other dataset and/or data file. Documents 104a-104n may be depicted on a desktop interface 102 in a conventional manner as would be appreciated. For example, documents 104a-104n may be depicted using an icon, textual list, image, and/or other depiction. Furthermore, as used herein, the term document may be used interchangeability with the term "document depictions."

According to various implementations of the invention, system 100 may include hardware and/or software modules, such as a doc drop module 130. Doc drop module 130 may include one or more of the following modules: an operating system ("O/S") interface module 110, a drop doc generator module 112, a user interface module 114, listener module 116, a login module 118, an administrative module 120, a database interface module 122, and/or other modules.

In some implementations, OS interface module 110 may query, interface, or otherwise interact with an operating system of computing device 150. Interactions may include polling the operating system for resources, detecting hardware events (such as mouse-tracking), determining the file location of one or more documents, and/or other interactions. In some implementations doc drop generator module 112 may generate a persistent doc drop element 108 on desktop interface 102 in conjunction with OS interface module 110. Doc drop generator module 112 may create a persistent doc drop element 108, which is semi-transparent, always visible and accessible about the foreground of desktop interface 102, and may comprise a sticky icon, hyperlink, window, or other area that is movable about desktop interface 102. In some embodiments, the degree of transparency of persistent doc drop element 108 may be modified, configured, or otherwise varied. Doc drop generator module 112 may be implemented, for example, using any computing language that enables generation of graphical on the operating system. User Interface (UI) module 114 may generate a GUI 106 rendered on desktop interface 102. GUI 106 may present the user with selectable options and/or otherwise enable users to input data for associated with the one or more documents that will be uploaded to the document management database and options to configure the system. In some implementations, listener module 116 may interface with OS interface module 110 to listen for, receive, and process events that may be relevant to the system. For example, listener module 116 may detect and process events such as drag and drop events using a mouse, key entries using a keyboard, and/or other events.

In some implementations, login module 118 may authenticate a user accessing the system 100 according to methods well known in the art. Such methods may include, for example, use of a shared secret (e.g., a username, password, etc.), authentication based on an input/output device such as a USB device, biometric identification, and/or other authentication method. In some implementations, administrative module 120 may enable system administrative functions such as, for example, configuring system 100 to interact with particular databases, setting account information (e.g., username and passwords), defining controlled vocabularies used by system 100, setting the transparency properties of persistent doc drop element 108, and/or other administrative functions. In some implementations, database interface module 122 may access and/or interface with database 140 to perform database operations such as, for example, insert, retrieve, update, and/or perform other database operations. For example, database 140 may store and retrieve the controlled vocabularies using database interface module 122. Database interface module 122 may associate persistent doc drop element 108 with a document management database. Although otherwise not illustrated, the document management database may be a third party database, may comprise database 140, may be part of database 140, or any other combination. Modules described herein are exemplary and that modules may interface with one another to perform a particular task. Furthermore, one or more modules may be combined and additional modules may be used as appropriate.

In some implementations, doc drop module 130 may be executed on a computing device 150. Computing device 150 may be any computing device such as, for example, a server, a desktop computer, laptop computer, personal digital assistant, smart phone, and/or any other computing device. Other configurations and system architectures may be used. For example, although not shown, computing device 150 may be or include one or more servers connected to one or more clients via a network such as a Wireless Area Network, Local Area Network, the Internet, and/or other network or combination thereof. Computing device 150 may be coupled to at least one database 140 that stores system data such as a plurality of document types and associated document descriptions, administrative information, or any other data. Database 140 may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. Although illustrated as being separate from computing device 150, database 140 may be part of or hosted by computing device 150.

System 100 may also include a display 101. Display 101 may be any display known in the art. Display 101 may display desktop interface 102.

Figure 2A:
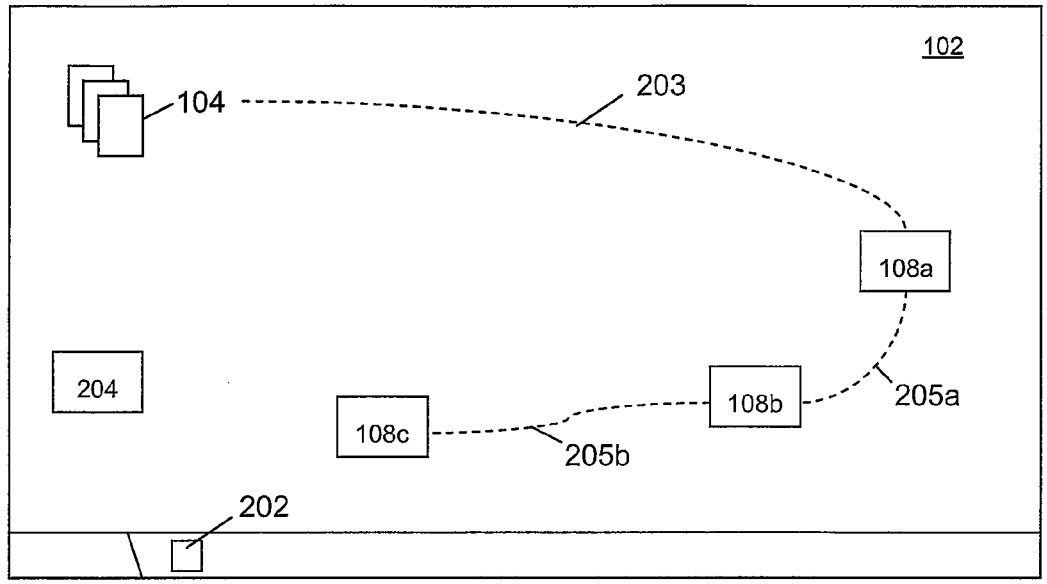
FIG. 2A illustrates an exemplary desktop interface, according to various aspects of the invention.

FIG. 2A illustrates an exemplary representation of persistent doc drop element 108 on desktop interface 102 according to various implementations of the invention. In some implementations, upon installation of doc drop module 130, a tray icon 202 may be installed on a tray of the operating system and a shortcut icon 204 may be installed on desktop interface 102 as would be appreciated by those having ordinary skill in the art. Clicking or otherwise selecting tray icon 202 may enable access to system configurations via the administrative module 114, as described herein elsewhere. One or more documents 104a-104n may be dragged across desktop interface 102 and dropped at or near persistent doc drop element 108 following imaginary path 203 or other path. Doing so initiates a request to upload the dragged and dropped one or more documents 104. Persistent doc drop element 108 may be moved about desktop interface 102 following an imaginary path such as, for example, path 205a-b, or any other path. By doing so, persistent doc drop element 108 may be placed in any location about desktop interface 102 such as, for example, locations 108a, 108b, 108c, or any other location about desktop interface 102.

Figure 2B:
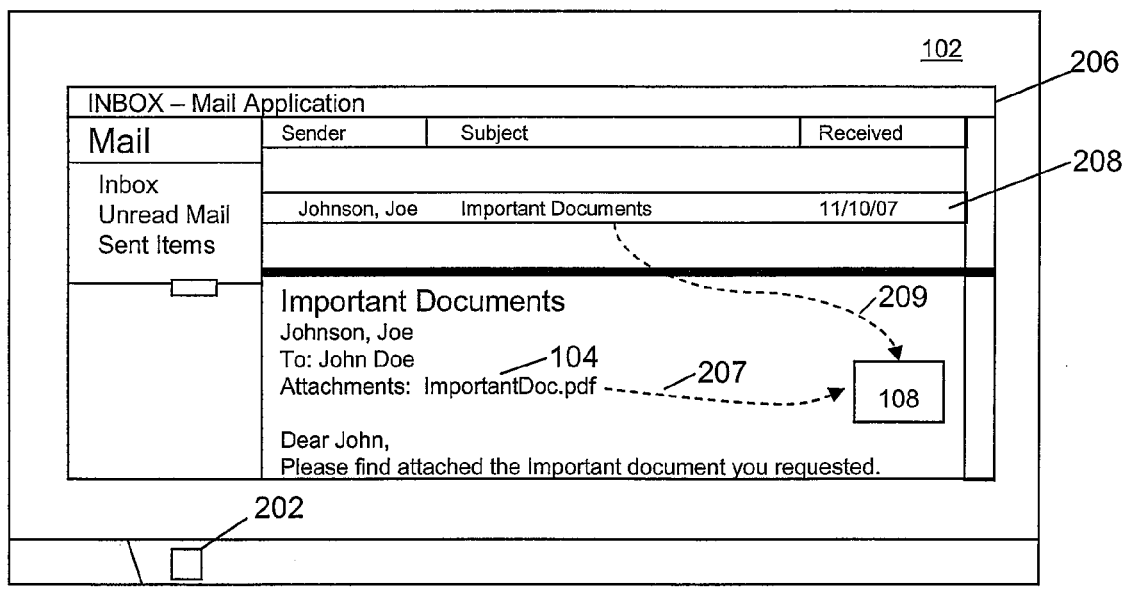
FIG. 2B illustrates an example of a persistent doc drop element 108 visible through an email application being displayed on a desktop interface, according to various aspects of the invention.

FIG. 2B illustrates an exemplary representation of persistent doc drop element 108 as seen through an email application 206 running on desktop interface 102. Upon initializing email application 206 running on desktop interface 102, a user interface of the email application 206 may occupy the same pixel locations as persistent doc drop element 108. Ordinarily, a typical icon will be obscured and inaccessible without minimizing, closing, or otherwise moving the overlapping application. Furthermore, icons in toolbars of an operating system, for example, remain fixed to the toolbar. However, as illustrated in FIG. 2B, doc drop 208 remains visible, accessible, and movable about desktop interface 102, maintaining the same functionality as set forth above in FIG. 2A. Thus, one or more documents displayed or embedded within email application 206, for example, may be dragged and dropped across email application 206 and/or desktop interface 102 following, for example, imaginary path 207 or other path to persistent doc drop element 108. In some implementations, a message thread 208 including attached one or more documents 104a-104n may be dragged and dropped across email application 206 and/or desktop interface 102 following imaginary path 209 or other path to persistent doc drop element 108. Although described herein as a drag and drop function, any other input method to indicate a request to upload the one or more documents to the database may be used such as the use of quick keys or other hot keys, other mouse actions, and/or other input methods.

Figure 3:
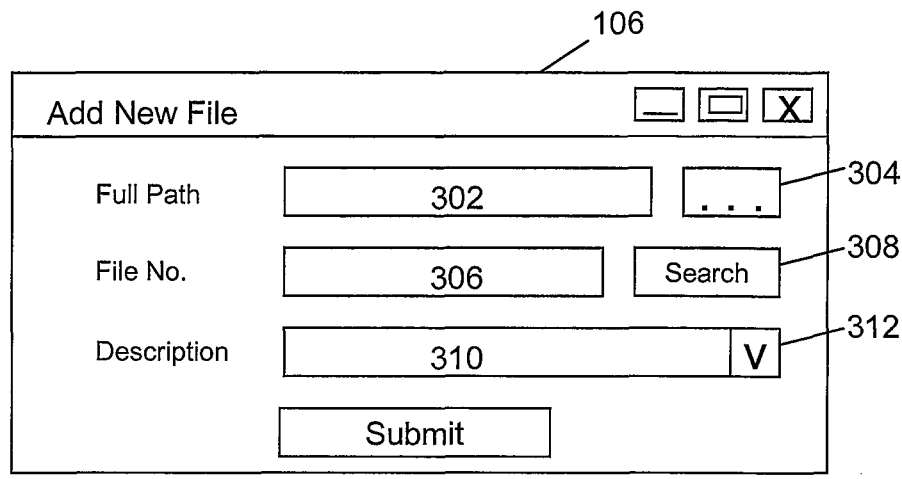
FIG. 3 illustrates an exemplary dialog box for receiving input from a user to upload one or more documents to a document management database according to various implementations of the invention.

FIG. 3 illustrates an exemplary GUI 106 according to various implementations. In some implementations, GUI 106 may be presented when a request to upload the one or more documents is detected. This detection may result, for example, from a drag and drop into persistent doc drop element 108. GUI 106 may present one or more input forms to a user and GUI 106 may be implemented using any interface input format such as, for example, a hyper-text markup language form or any other interface input format. For example, if one or more documents are dropped over persistent doc drop element 108 by the user, GUI 106 may present the user with a form to enter data associated with the dropped one or more documents. In this case, because the one or more documents was dropped over persistent doc drop element 108, a file input entry 302 may be pre-filled with information regarding the source location of the dropped one or more documents. In some implementations, a browse button 304 may be used to change the location of the dropped one or more documents. However, if the request to upload the one or more documents was not from a drag and drop event (but was, for example, the result of a keyboard shortcut key input "F2" or other action), then the user may input the location of the one or more documents using browse button 304 or otherwise provide the source location to GUI 106.

In some implementations, the user may then use destination entry 306 to enter an identifier associated with a destination location to which the one or more documents is to be uploaded. If known, the user may enter the identifier into destination entry 306. If unknown, the user may launch a search for the identifier by clicking or otherwise selecting destination search button 308. As used herein "button" may be any input indicator such as a form button, hyperlink, or other input indicator. In some implementations, the user may enter a description in to description entry 310. The description may correspond to a specific destination location for the one or more documents. In some implementations, descriptions may be controlled by the administrator as a controlled vocabulary, as would be appreciated. In some implementations, the description may be entered by the user outside of a controlled vocabulary. The description may be used during searches launched by destination search button 308 to help the user identify an appropriate destination location for the one or more documents. In some implementations, the user may click or otherwise select description selector 312 to select from a list of descriptions.

Figure 4:
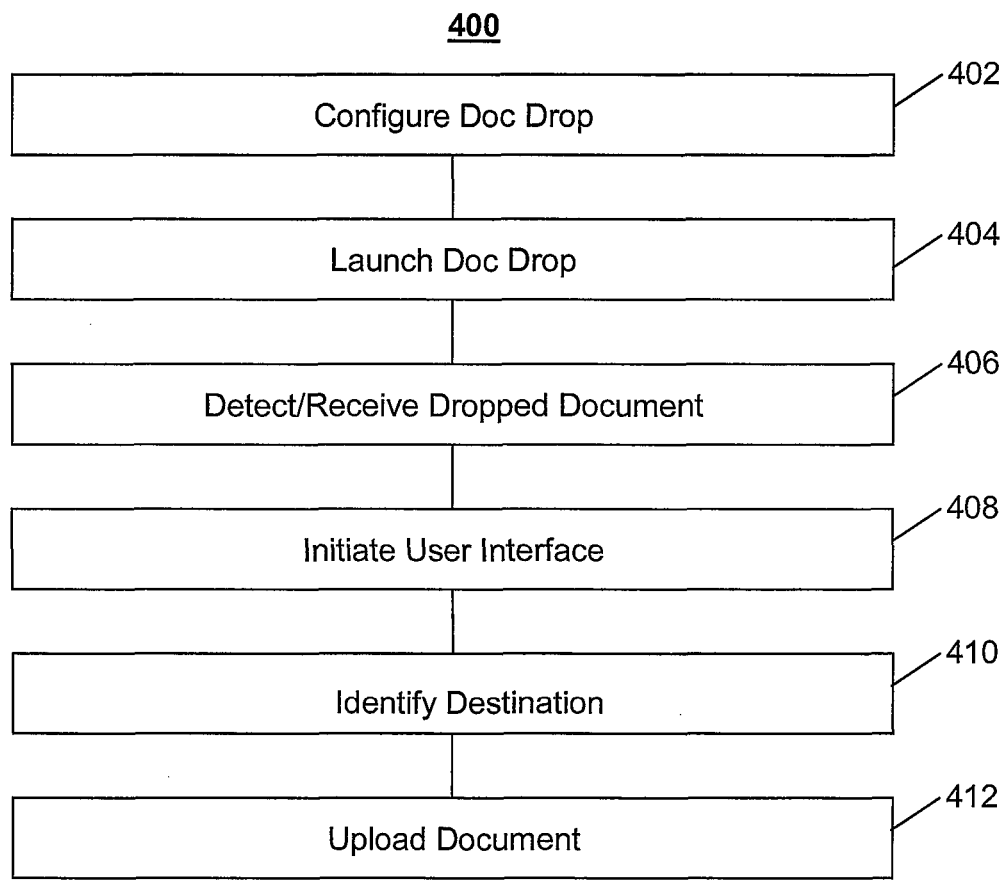
FIG. 4 illustrates an exemplary process for user interaction with a doc drop module, according to various implementations of the invention.

FIG. 4 illustrates a process 400 for uploading one or more documents to database 140 according to various implementations of the invention. The described operations may be accomplished using some or all of the system components described in detail above and, in some implementations, various operations may be performed in different sequences. In other implementations, additional operations may be performed along with some or all of the operations shown in FIG. 4. In yet other implementations, one or more operations may be performed simultaneously. Accordingly, the operations described are exemplary in nature and, as such, should not be viewed as limiting.

In an operation 402, an administrator may configure the system. Configurations may include system functions such as setting/changing passwords, defining destination location controlled vocabularies, associating the system with one or more databases, and/or other system functions. In an operation 404, a user may initiate a system according to one of various implementations of the invention. After system initiation doc drop module 130 may generate persistent doc drop element 108 onto desktop interface 102 and begin listening for event inputs. As discussed elsewhere herein, event inputs may be drag and drop event inputs, keyboard shortcut key input, or any other input as would be appreciated by those skilled in the art.

In an operation 406, one or more event inputs to upload one or more documents may be received and/or detected. Once the one or more event inputs are received and/or detected, a user interface may be generated and provided to the user in an operation 408. The location of the one or more documents to be uploaded is identified. For example, if the input is a drag and drop of the one or more documents, then the location of the one or more documents that was dragged and dropped is used. In some implementations, the user may input the location of the one or more documents to be uploaded.

In an operation 410, the location of the destination may be identified. Identification may comprise the user entering in an identifier associated with the destination location. Alternatively or additionally, the user may initiate a search to find destination locations previously used. A description of the destination location may be included. The description may be entered by the user and/or selected from a list of descriptions.

In an operation 412, the one or more documents may be uploaded to the database 140 based at least in part on the destination location. Uploading to the database may include a file copy to a file-based database, image copy of the one or more documents to a document image database, and/or other database upload technique, which are known in the art. Each of the uploaded one or more documents may be assigned a unique document identifier wherein each document identifier is associated with the destination location identifier. The association may be stored in database 140. Accordingly, the one or more documents may be located by querying the association between the document identifier and the destination location identifier. Thus, uploading to database 140 may include datasets comprising the one or more documents, association, and/or other datasets.

Figure 5:
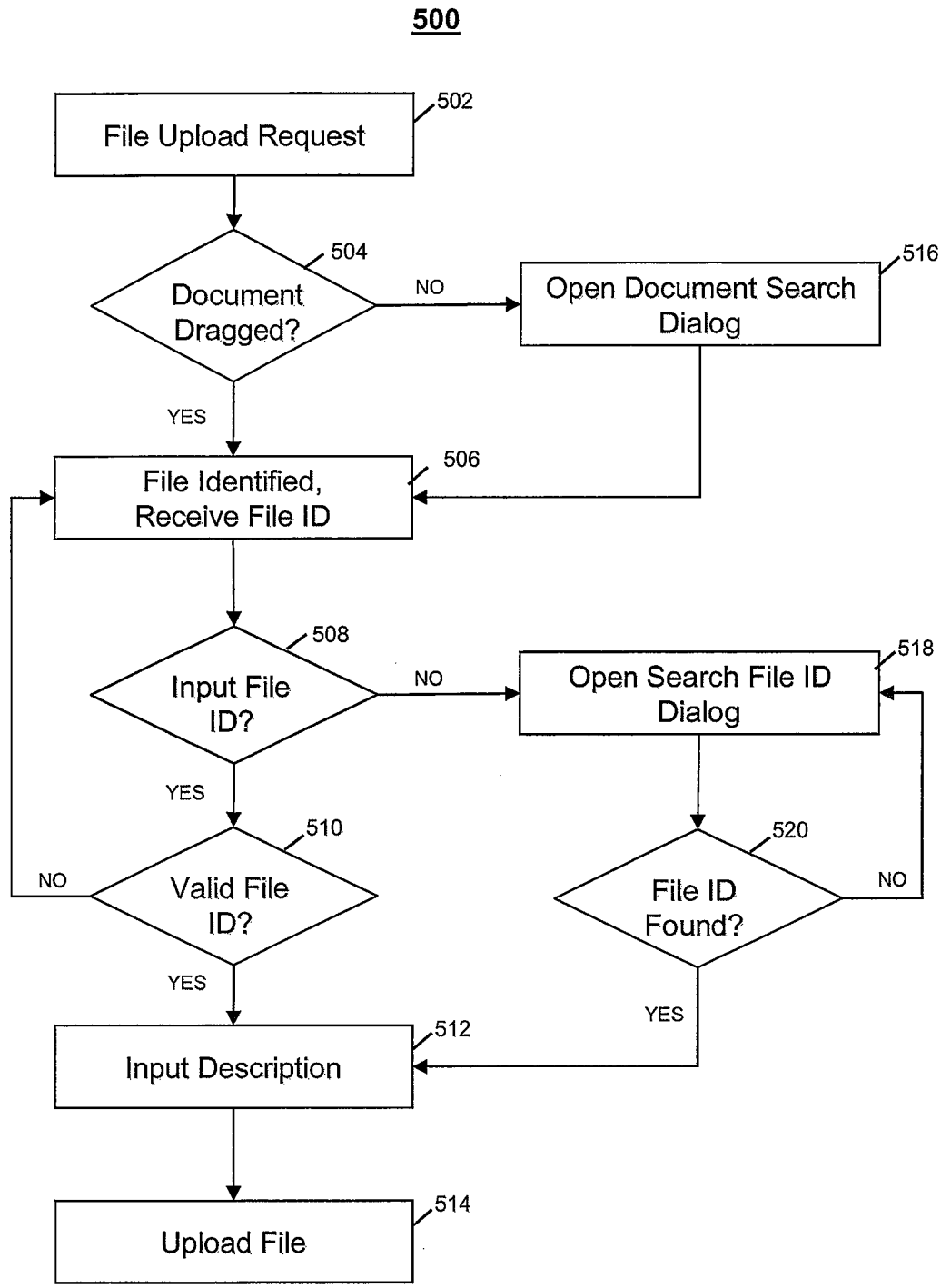
FIG. 5 illustrates an exemplary process for initiating an upload, according to various implementations of the invention.

FIG. 5 illustrates a process 500 for preparing datasets for upload to database 140 according to various implementations of the invention. The described operations may be accomplished using some or all of the system components described in detail above and, in some implementations, various operations may be performed in different sequences. In other implementations, additional operations may be performed along with some or all of the operations shown in FIG. 5. In yet other implementations, one or more operations may be performed simultaneously. Accordingly, the operations described are exemplary in nature and, as such, should not be viewed as limiting.

In an operation 502, a request may be made to upload one or more documents. If in an operation 504, the request is based on a drag and drop of the one or more documents over persistent doc drop element 108, then process 500 may proceed to an operation 506, wherein the one or more documents is identified based at least in part on the drag and drop. Operation 506 may also include receiving a document type associated with the one or more documents. Returning to operation 504, if the request is not based on a drag and drop or other method that identifies the one or more documents to be uploaded, processing may proceed to an operation 516, wherein a document search ("browse file") is provided. When the one or more document is selected using the document search, processing may proceed to operation 506, wherein the one or more documents is identified and the destination location is received.

If in an operation 508 a document type is received, then processing may proceed to an operation 510, wherein the document type may be validated. If valid, then process 500 may proceed to an operation 512, wherein a description may be associated with the document type. Process 500 may then proceed to an operation 514, wherein datasets such as the one or more documents, document type, document description and/or other datasets are conveyed to the document management database. Returning to operation 510, if the destination location is not valid, then processing may return to an operation 506, wherein document type is received.

Returning to operation 508, if the document type is not received, then processing may proceed to an operation 518, wherein a document type search may be provided. If a document type is received and has been found in an operation 520, then processing may proceed to operation 512, wherein a document description is associated with the document type. Returning to operation 520, if the document type has been received but not found, then processing may return to an operation 518, wherein the document type location search may be provided.

Figure 6:
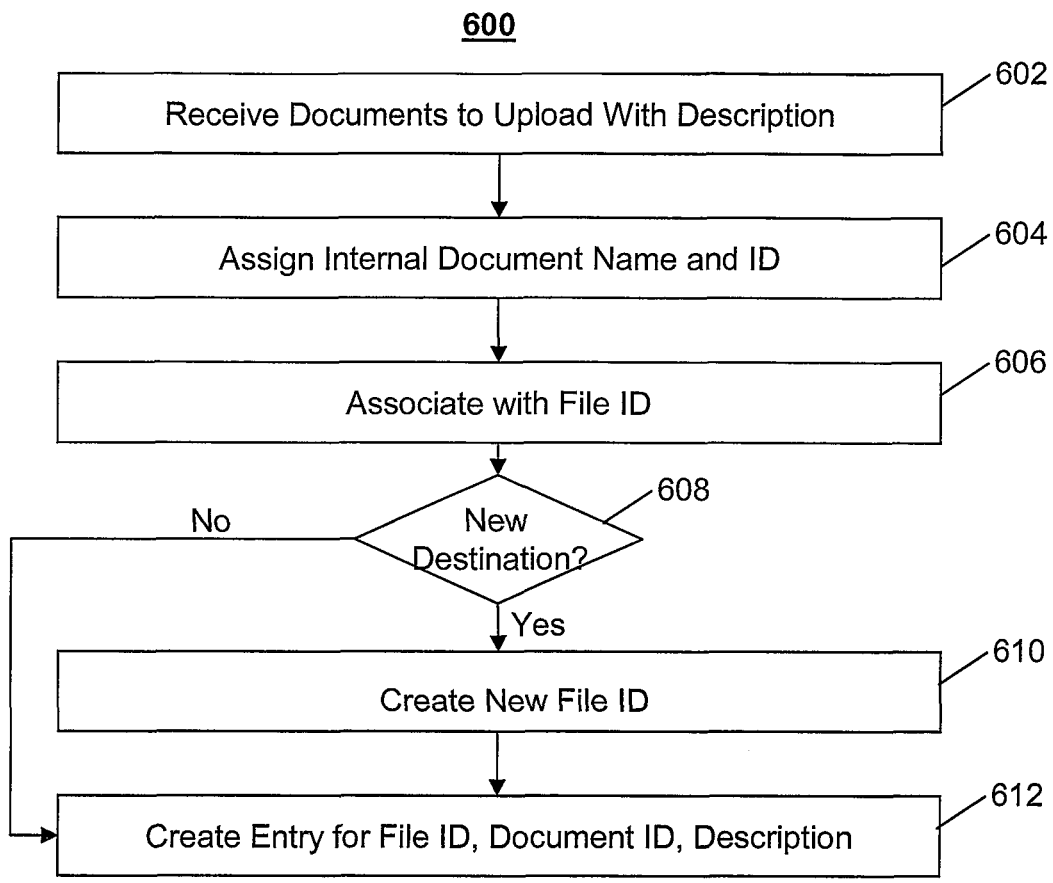
FIG. 6 illustrates an exemplary process for uploading one or more documents to a document management database, according to various implementations of the invention.

FIG. 6 illustrates a process 600 for uploading datasets to database 140 according to various implementations of the invention. The described operations may be accomplished using some or all of the system components described in detail above and, in some implementations, various operations may be performed in different sequences. In other implementations, additional operations may be performed along with some or all of the operations shown in FIG. 6. In yet other implementations, one or more operations may be performed simultaneously. Accordingly, the operations described are exemplary in nature and, as such, should not be viewed as limiting.

Process 600 may include an operation 602, wherein the one or more documents may be received with a destination description. In an operation 604, a unique identifier may be assigned to each of the one or more documents. In an operation 606, the one or more documents and destination description may be associated with a destination identifier. If in an operation 608 the datasets are to be uploaded to a new destination, then processing may proceed to an operation 610, wherein a new destination and an identifier for that destination is generated. In an operation 612, the datasets comprising the one or more documents, destination, destination description, and/or other datasets are associated to one another and uploaded to database 140. It should be understood that entries comprising the associations may be uploaded to database 140 in a separate or in the same operation. Returning to operation 608, if a new destination is not to be used, then processing may proceed to operation 612.

Although described herein as uploading datasets to database 140, it should be understood that the invention may use and/or interface with any external database such as a third party document management database to store none, part, or all of the datasets.

Implementations of the invention including any modules described herein may be made in hardware, firmware, software, or any suitable combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A method, comprising:
generating, by a system including a processor, a visually persistent desktop element that, regardless of user action, user inaction, and actively running application programs, is continuously visible on a desktop interface of an operating system, wherein the visually persistent desktop element at all times is displayed on top of any actively running application program;
interfacing, by the system, the visually persistent desktop element with a document management database, wherein the document management database stores a document based on one of a document description and administrative information;

detecting, by the system, from the operating system, an event associated with the visually persistent desktop element that initiates a request to facilitate storing the document to the document management database;

identifying, by the system, a source storage location associated with the document based on the event;

receiving, by the system, a document type associated with the document, wherein the document type identifies the document;

associating, by the system, the document type with a document description, wherein the document description describes the document type; and facilitating, by the system, storing of the document to a destination location on the document management database, wherein the destination location is determined as a function of one of the document type and document description and wherein the document description is one of a sales date time period and a sales agent.

2. The method of claim 1, wherein the event is a drag of a depiction of the document from an application running on the operating system across the desktop interface and over a second application running on the operating system and displayed on the desktop interface, and a drop of the depiction of the document to a location proximate to the visually persistent desktop element.

3. The method of claim 2, wherein the drag and the drop of the depiction of the document originates from the depiction of the document being imbedded in the application running on the operating system.

4. The method of claim 3, wherein the application running on the operating system is an email application.

5. The method of claim 1, wherein the visually persistent desktop element is an icon.

6. The method of claim 1, wherein the visually persistent desktop element is movable about the desktop interface of the operating system.

7. The method of claim 1, wherein the visually persistent desktop element is semi-transparent to permit an actively running application to be visible beneath the persistent desktop element.

8. The method of claim 7, wherein a degree of semi-transparency associated with the visually persistent desktop element is configurable.

9. A method, comprising:

detecting, by a system that includes a processor, a drag and drop event on a desktop interface of an operating system, wherein a depiction of a document is dropped onto a persistent desktop element, wherein the depiction of the document is associated with a source location of the document, and the persistent desktop element, regardless of user activity, user inactivity, and executing application programs, is continuously visible and continually accessible on the desktop interface of the operating system;

receiving, by the system, a document type for the document;

associating, by the system, the document type with a document description, wherein the document description describes the document type;

communicating, by the system, the document type and the document description to a document management database; and facilitating, by the system, storing of the document to a destination storage location on the document management database, wherein the destination storage location is based on a unique document storage identifier determined as a function of one of the document type and the document description.

10. The system of claim 9, wherein the persistent desktop element is semi-transparent to enable an actively running application to be visible beneath the persistent desktop element.

11. The system of claim 10, wherein a degree of semi-transparency associated with the persistent desktop element is modifiable.

12. A system, comprising:

a memory to store instructions; and a processor, communicatively coupled to the memory, that facilitates execution of the instructions to perform operations, comprising:

generating a persistent desktop element, wherein the persistent desktop element, irrespective of user action, user inaction, and an actively running application program, is at all times visible on a desktop interface of an operating system on top of the actively running application program;

facilitating a creation of a data interchange between the persistent desktop element and a document management database;

detecting, from the operating system, an event associated with the persistent desktop element, wherein the event indicates a request to initiate an upload of a document to the document management database;

identifying the document based on the event; and as a function of the request to initiate the upload, receiving a document type for the document, associating the document type with a document description, wherein the document description describes the document type, facilitating a transfer of the document type and the document description to the document management database, and facilitating storage of the document to a destination storage location associated with the document management database, wherein the destination storage location is based on a unique identifier and a destination identifier associated with the document and wherein the unique identifier and the destination identifier are determined as a function of one of the document type and the document description.

13. The system of claim 12, wherein the event includes a drag and drop of the document to the persistent desktop element, wherein the drag and drop includes dragging a depiction of the document from an application running on the operating system over an executing second application displayed on the desktop and dropping the depiction of the document onto the persistent desktop element.

14. The system of claim 13, wherein the drag and drop originates from the depiction of the document imbedded in the application running on the operating system.

15. The system of claim 14, wherein the application running on the operating system is an email application.

16. The system of claim 12, wherein the persistent desktop element is an icon.

17. The system of claim 12, wherein the persistent desktop element is movable about the desktop interface of the operating system.

18. The system of claim 12, wherein the event causes a user modifiable form to be displayed, the user modifiable form includes a field that contains pre-filled information regarding a source location of the document.

19. The system of claim 12, wherein the event causes a graphical user interface (GUI) to be displayed, wherein the GUI comprises a browser button that is employed to change a destination storage location of the document on the document management database.

20. The system of claim 19, wherein the GUI further includes a description entry field, and wherein a vocabulary employable within the description entry field is constrainable during setup of the system.

* * * * *